United States Patent [19]
Stone

[11] Patent Number: 5,813,737
[45] Date of Patent: Sep. 29, 1998

[54] CONSTRUCTION SYSTEM

[76] Inventor: Adrian Thomas Stone, 783 High Street, Regent, Victoria 3073, Australia

[21] Appl. No.: 799,123

[22] Filed: Feb. 13, 1997

[51] Int. Cl.[6] ................................................ A47B 47/00
[52] U.S. Cl. ...................... 312/257.1; 108/187; 108/155; 211/153; 220/428; 217/12 R; 52/263; 52/653.1; 403/172; 403/217
[58] Field of Search ................................ 312/257.1, 263, 312/265.1, 265.2, 265.3, 265.4, 351; 108/180, 187, 193, 155, 153.1; 211/153, 186, 194, 189; 403/400, 346, 347, 172, 171, 176, 217; 220/428, 431, 690; 217/12 R, 43 R; 52/263, 268, 126.5, 284, 36.5, 36.6, 36.4, 653.1

[56] References Cited

U.S. PATENT DOCUMENTS

| | | | |
|---|---|---|---|
| Re. 22,562 | 11/1944 | Kautz | 211/189 X |
| 2,097,172 | 10/1937 | Yurkovitch | 403/347 X |
| 3,081,139 | 3/1963 | Hines et al. | 312/351 |
| 3,669,033 | 6/1972 | Murcia | 108/180 |
| 3,887,288 | 6/1975 | Glaser | 211/189 X |
| 3,948,581 | 4/1976 | Helman et al. | 312/257.1 X |
| 3,966,337 | 6/1976 | Crawford | 312/257.1 X |
| 5,065,873 | 11/1991 | Tseng | 108/187 X |
| 5,127,341 | 7/1992 | Wiklund | 211/189 X |

FOREIGN PATENT DOCUMENTS

| | | | |
|---|---|---|---|
| 153426 | 9/1985 | European Pat. Off. | 312/265.4 |
| 2528294 | 12/1983 | France . | |
| 2629532 | 10/1989 | France . | |
| 4207221 | 9/1993 | France . | |

*Primary Examiner*—Jose V. Chen
*Assistant Examiner*—Janet M. Wilkens
*Attorney, Agent, or Firm*—Ladas & Parry

[57] ABSTRACT

A construction system suitable for erecting a modular structure such as a furniture item or the like. A first part is connectable with a second part by a releasable cross connection. A third elongate part has a cavity extending substantially over its full length for receiving the cross connection at a position therealong. The third part may be a leg member for the furniture item and the first and second parts may be rail members. Alternatively, the first part may be a coupling element for connecting modular structures together or a hinge element for pivotably attaching a door panel, the second part being a securing element for securing the coupling or hinge element to a leg member. A modular structure and a method of erecting a modular structure are also disclosed.

25 Claims, 10 Drawing Sheets

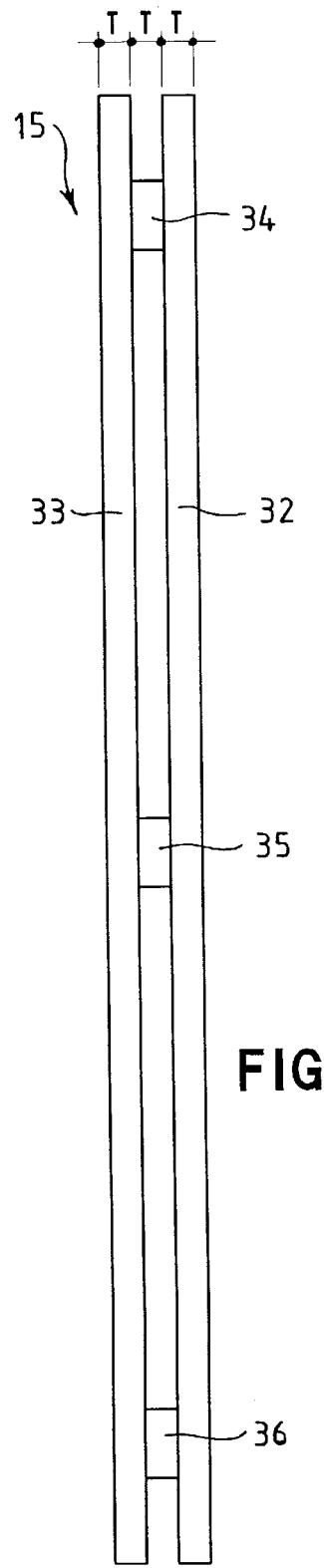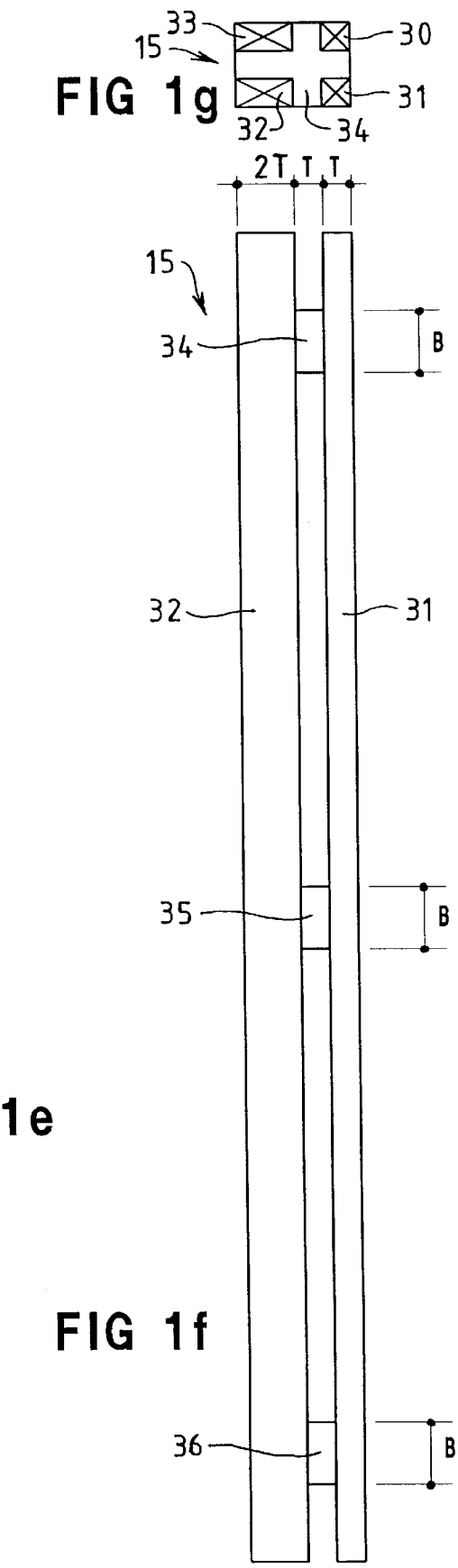
FIG 1e
FIG 1f
FIG 1g

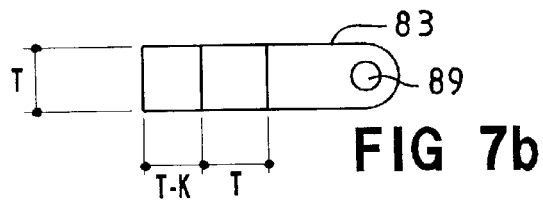
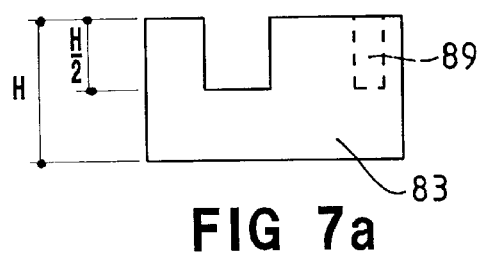
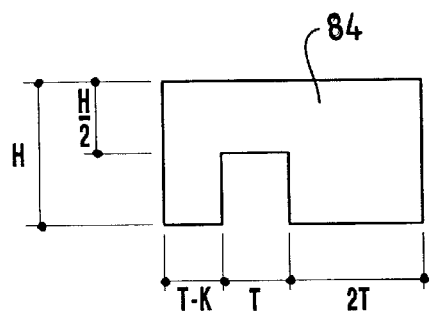
FIG 7b
FIG 7a
FIG 7c
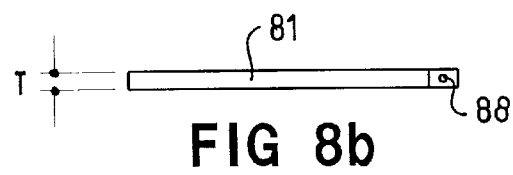
FIG 8b
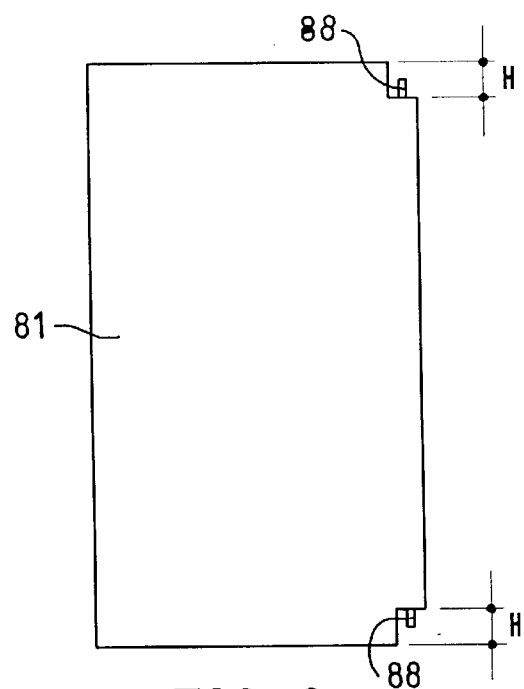
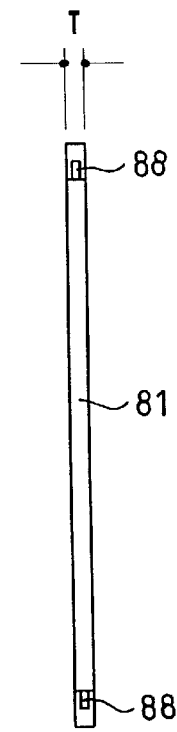
FIG 8a
FIG 8c

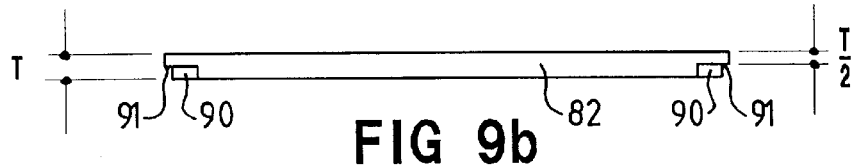
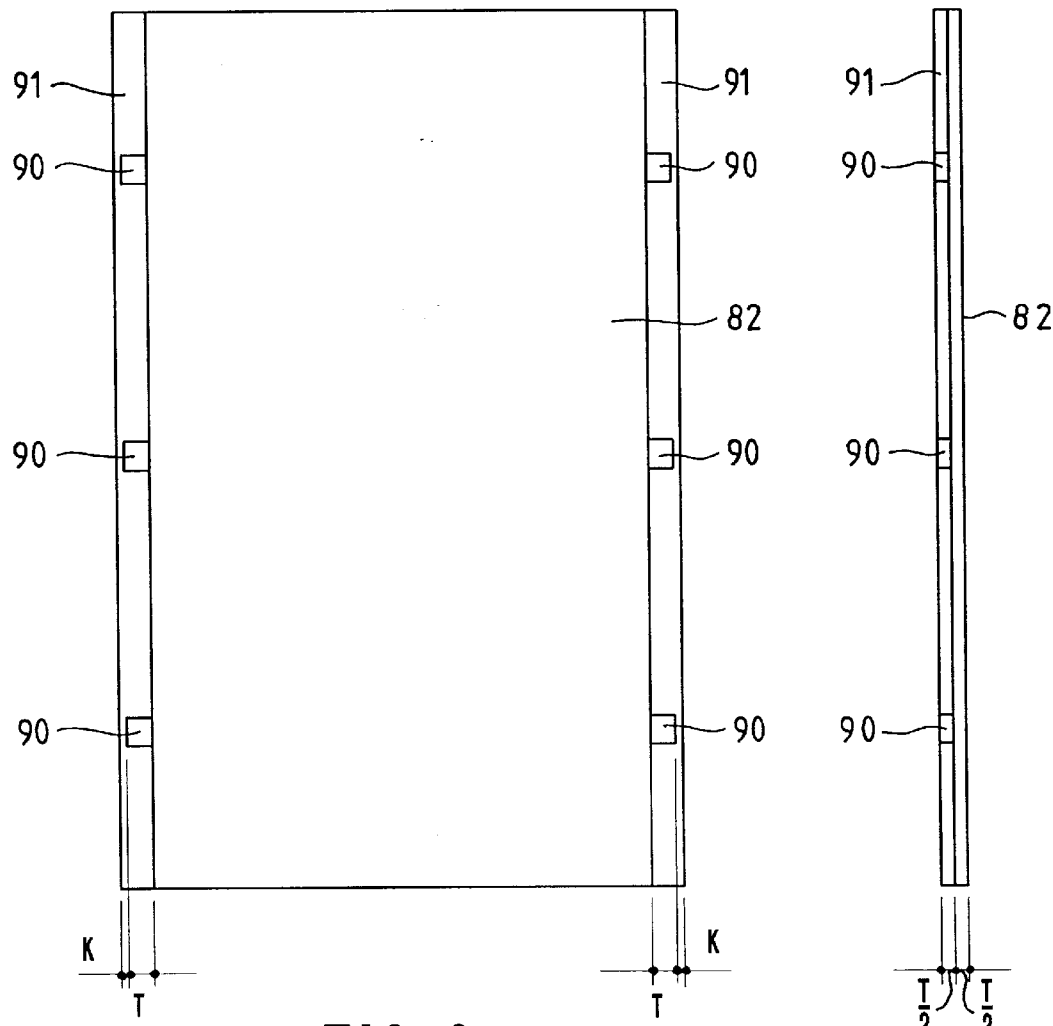
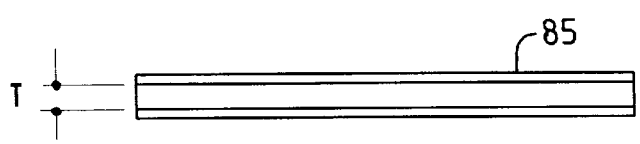
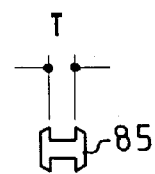

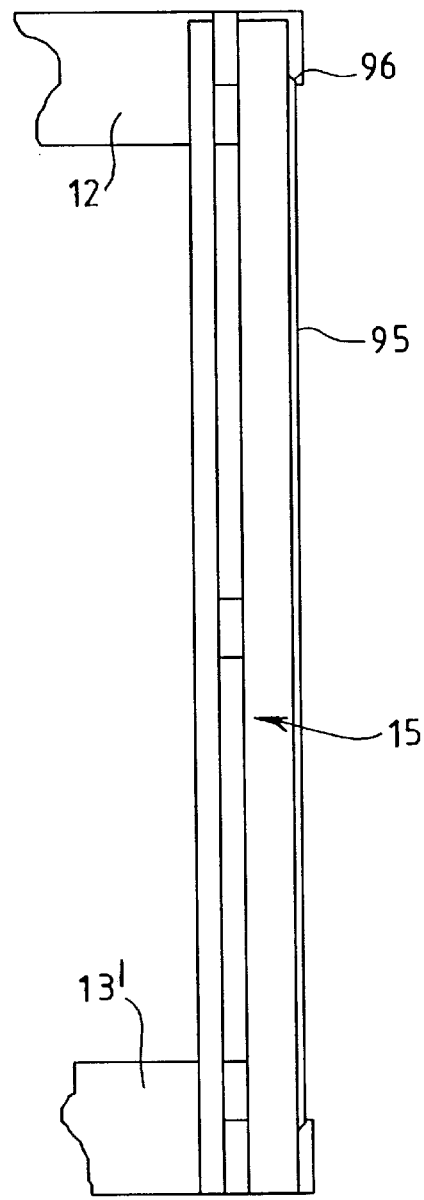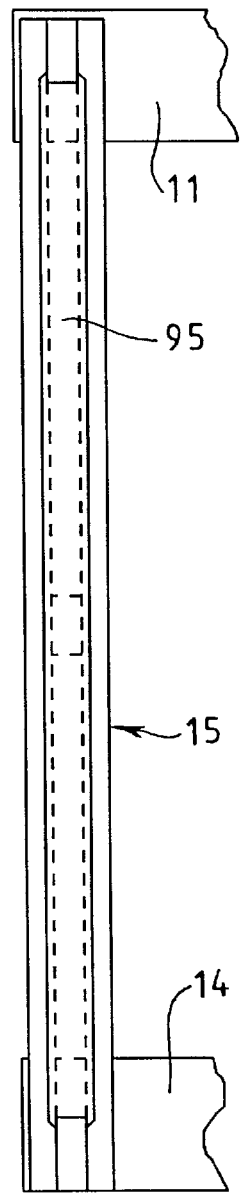
FIG 11b  FIG 11a
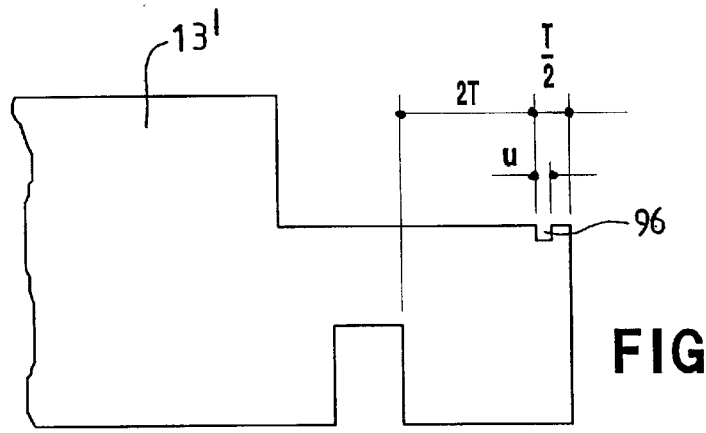
FIG 12

CONSTRUCTION SYSTEM

BACKGROUND OF THE INVENTION

1. Field of the Invention

The present invention relates to modular structures, and more particularly to a construction system providing readily erectable and demountable modular structures. The system is applicable to the construction of furniture items such as shelving units for display or storage purposes, as well as tables, work benches, platforms and the like. It will be convenient to hereinafter describe the invention in relation to that exemplary application but it should be appreciated that the invention is not limited to that application.

2. Description of the Prior Art

Various modular furniture systems exist in the prior art and these are often supplied in "flat packed" form for ease of shipping and handling. Generally, however, the prior art systems rely on removable fastenings to provide the strength and rigidity necessary in the assembled furniture item. The fastenings are usually time consuming to apply and remove, and often require special tools to assemble or dismantle the item. This may not be a problem where the item is to be assembled on delivery and then left in its assembled form indefinitely, or where it is to be only rarely dismantled for relocation to another site. However, where the item of furniture must be dismantled frequently for relocation or where modules of a furniture assembly must be periodically reconfigured for different purposes, such as in display shelving in a retail outlet, then the time required to assemble and dismantle the modules becomes a significant drawback of present modular systems.

There is therefore a need for a construction system which provides readily erectable and demountable modular structures which may be suitable for use as furniture items.

SUMMARY OF THE INVENTION

The present invention accordingly provides a construction system suitable for erecting a modular structure, said system including:

a first part connectable with a second part by means of a releasable cross connection; and an elongate third part having a cavity extending substantially over its full length for receiving said cross connection at a position therealong.

The invention also provides a modular structure erected be means of the construction system of the invention.

The invention further provides a method of erecting a modular structure including the steps of:

providing a first part and a second part, said first and second parts being connectable by a releasable cross connection;

providing an elongate third part having a cavity extending substantially over its full length;

positioning the first part such that it intercepts the cavity in a first direction;

positioning the second part such that it intercepts the cavity in a second direction; and connecting the first and second parts within the cavity.

Preferably, the cavity has in transverse cross-section a profile which is adapted to envelop the cross connection. In one preferred form, the third part is generally rectangular in transverse cross-section and the cavity is generally cross-shaped in transverse cross-section, the cavity being accessible from each major face of the third part.

The third part may include four elongate elements fixed together by means of a spacer element. Where the third part is rectangular in transverse cross section, the elongate elements may also be rectangular. Where however the third part is, for example, circular in transverse cross section the elongate elements may be of quadrant section. In any case, the first and second cross connected parts are receivable within the cavity formed between the elongate elements. The spacing between the elements is preferably chosen to provide a snug fit around the cross connection so as to impart rigidity to the erected structure.

In one embodiment the third part includes support means for supporting the cross connection at a selected position along the elongate third part. Preferably the support means is provided by the spacer element between the elongate elements. The support means or spacer element may be provided in the form of a block element mounted within the cavity. Preferably the block element is cross-shaped.

In one embodiment the first, second and third parts are configured such that, in use, at least one of the first and second parts projects normally from the third part. The third part may extend vertically and the first and second parts may extend horizontally.

In one preferred aspect of the invention the third part comprises a leg member for a furniture item or the like and the first and second part each comprise a rail member disposed transversely to the leg member. Preferably, the leg member extends vertically and the rail members extend horizontally. In one arrangement, four leg members are employed to erect a cuboid structure such as a table, shelving unit or cupboard. In this cuboid configuration the cross connections form right angles, but for other configurations the cross connections may not be at right angles. For example, a right equilateral triangular prism may require cross connections at 60°. Alternatively, three or more rail members may be cross connected at appropriate angles.

Preferably, each rail member is generally rectangular in shape and is formed from planar material such as wood having a uniform thickness. The length of the rectangle may define the length of the rail members, and may also define a horizontal dimension of the assembled furniture item, and the width of the rectangle may define the vertical depth of the rail members.

In one embodiment the cross-sectional geometry of each leg member is arranged as a multiple of the thickness of the rail member material. For example, if the rail member thickness is 1 unit, then the elongate elements which make up a leg member may each be 1 unit square in cross section. In this arrangement the leg members would each have a cross section of 3 units×3 units. In practice, the actual dimensions of the leg members are determined by factors such as the mechanical properties of the material and aesthetic considerations. Applicant has found that if 18 mm medium density fibreboard (MDF) is used (18 mm=1 unit) then leg members having 2 square section elements of 1 unit each and 2 rectangular section elements of 1 unit×2 units, giving a total dimension of 3 units×4 units, provides sufficient mechanical strength for furniture construction while achieving aesthetically pleasing proportions.

In one embodiment at least one rail member includes abutment means, the abutment means being offset from the cross connection along the length of the leg member, for abutting the leg member. In this way, the joint between the cross connected rail members and the leg member is given additional support and rigidity, thus enhancing stability of the erected structure. Preferably the leg member includes means for receiving the abutment means and, more preferably, the receiving means is provided by a portion of the cavity. In one preferred embodiment, that portion of the cavity extends between a block element mounted within the cavity and a major face of the leg member. The block element in combination with the elongate elements of the leg member may effectively form keyways which engage the abutment means of the rail members to thereby further enhance stability of the erected structure.

In one embodiment a slot is provided adjacent the end region of each rail member for interlocking with a like slot of another rail member to form the cross connection. The cross connections are preferably formed as fully interlocked crossed halved joints whereby two rails of the same depth visually cross through each other at the same level. In this type of joint each slot has a width equal to the thickness of the adjoining rail and a depth equal to half the common depth of a rail. Alternatively, the depths of the slots in the respective rails may be other than half, but be arranged to sum to the common depth of a rail.

In one embodiment each rail member includes an elongate main body portion and a skirt portion, the main body portion containing the slots for interlocking the rail members and the skirt portion providing the abutment means for abutting the leg members. Preferably the skirt portion of each rail member extends between leg members of the modular structure and the abutment means are provided at respective ends of the skirt portion.

The construction system may also include one or more surface panels, being useable as table tops, shelves, seats or similar surfaces. Preferably each surface panel is provided with rebates in its lower face to engage and seat on the top edge of the rail members, thereby providing additional diagonal rigidity to an assembled structure. To this end, the top rails of a structure may be made slightly deeper so as to extend above the top of the leg members by an amount equal to the depth of the rebate in the top surface panel. In this way, the leg members will abut the bottom face of the top surface panel. Intermediate and bottom shelves may also be provided with rebates in their lower faces to more positively seat the shelves and provide additional rigidity to the structure.

In one embodiment, each leg member is provided with three rail support means or block elements whereby a furniture module may be erected having a top surface, bottom shelf and intermediate shelf. In this embodiment the bottom rails may be placed on the floor (skirt portion upwards) and interlocked to form a kickboard. The leg members may then be slid over the cross connections until the bottom rail support means abuts the bottom rails. A bottom shelf having cutouts around the leg members may be placed on the bottom rails. Intermediate rails may then be slid, one at a time, through the cross-shaped cavity in the leg members to be supported on the intermediate rail support means and interlocked in that position. An intermediate shelf may then be placed in position on the intermediate rails. Top rails may be slid down into the open cavity at the top of the legs to rest on the top rail support means and be interlocked in that position. A top surface panel may then be placed on the top rails.

In the latter embodiment the top and bottom rail support means are preferably positioned away from the top and bottom end of the leg members by a distance equal to the depth of the body portion of the top and bottom rails respectively. With this arrangement the leg members visually appear to extend from the floor to the top surface panel.

In another embodiment each leg member is provided with eight rail support means or block elements whereby a furniture module may be erected having up to six intermediate shelves. In this embodiment the blocks are preferably divided into two categories being primary and secondary respectively, wherein the secondary blocks are of reduced vertical size compared to the primary blocks. More preferably, the secondary blocks are half the depth of the primary blocks and are used at one or more intermediate positions in the leg.

In the latter embodiment, the rail members may also be divided into two categories, corresponding to the primary and secondary block categories for the leg members. Preferably the secondary rail members are of reduced depth compared to the primary rail members and, more preferably, the depth of the skirt portion of the rail members for each category of rail member corresponds to the vertical dimension of the block for that category.

Advantageously, the blocks in the leg members are symmetrically arranged such that the leg members are vertically reversible, ie. top to bottom. In this way, it doesn't matter which end of the leg member is chosen for the top or bottom.

It will be appreciated that leg members may be provided having different lengths. For example, half legs having four blocks each may be used to erect a structure useable as a coffee table and quarter legs having only two blocks each may be used to construct a low platform. Legs of different lengths may also be combined in a single furniture assembly.

Similarly it will be appreciated that rail members may be provided having different depths and different lengths, thus increasing the variety of shapes and sizes of structures which may be erected using the system.

In another preferred aspect of the invention the first part comprises a coupling element for coupling a leg member of one modular structure to a like leg member of another modular structure. In this embodiment the second part comprises a securing element for securing the coupling element to the first mentioned leg member. In this way any number of modules may be connected in any direction to erect a furniture assembly having any desired shape or size.

In another preferred aspect of the invention the first part comprises a hinge element for pivotably attaching a door panel to a leg member and the second part comprises a securing element for securing the hinge element to the leg member.

The construction system may also include one or more wall panels adapted to fit between the leg members of a modular structure. Preferably at least one edge of the wall panel is engagable within the cavity of a leg member so as to be held by the cavity at that edge. In one embodiment the wall panels include means for carrying a shelf panel, either directly or indirectly by means of a simplified form of rail member.

The construction system may also include a cover element for covering from view the cavity within the leg member. Preferably at least one of the rail members includes means for securing the cover element to the leg member.

Preferred embodiments of the present invention will now be described with reference to the accompanying drawings. It is to be appreciated that these embodiments are given by way of illustration only and the invention is not to be limited by the following detailed description.

BRIEF DESCRIPTION OF THE DRAWINGS

In the drawings:

FIGS. 1a–k show various components of a construction system according to an embodiment of the present invention.

FIGS. 7a–c show hinge and securing elements for use in the construction system of the invention.

FIGS. 8a–c show a door panel for use in the construction system of the invention.

FIGS. 9a–c show a wall panel for use in the construction system of the invention.

FIGS. 10a–c show an H-section retaining member for use with the wall panel of FIGS. 9a–c.

FIGS. 11a–b show a cover element for use in the construction system of the invention.

FIG. 12 shows one end of an alternative rail member for use with the cover element of FIGS. 11a–b.

DETAILED DESCRIPTION OF THE PREFERRED EMBODIMENTS

FIGS. 1a–k show various components of a construction system. The system includes rail members 11–14 (FIGS. 1a–d), leg members 15 (FIGS. 1e–g) and surface panels 16 and 17 (FIGS. 1h–k).

The components of the system may be erected into various multi-sided structures. The components may be provided in different sizes to increase the available range of structures which can be formed and thus enhance the construction flexibility of the system.

The rail members 11–14 and surface panels 16 and 17 are formed from substantially planar material having a thickness T. Applicant has found that medium density fiberboard (MDF) having a thickness of 18 mm is a suitable and convenient material for modular furniture items. However, other thicknesses or other materials may be used, depending on the application. Leg members 15 may also be formed using 18 mm MDF cut into appropriate sizes.

Figure 1A:
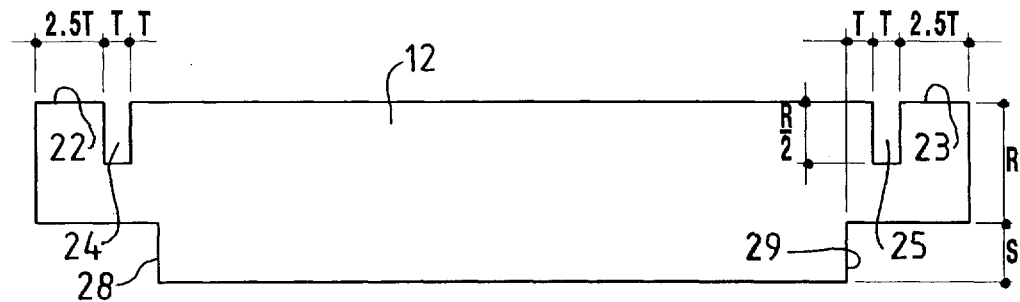
Figure 1B:
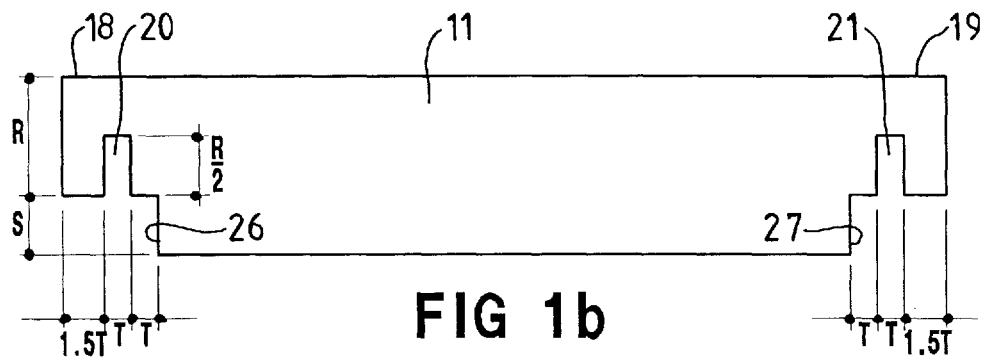
Figure 1C:
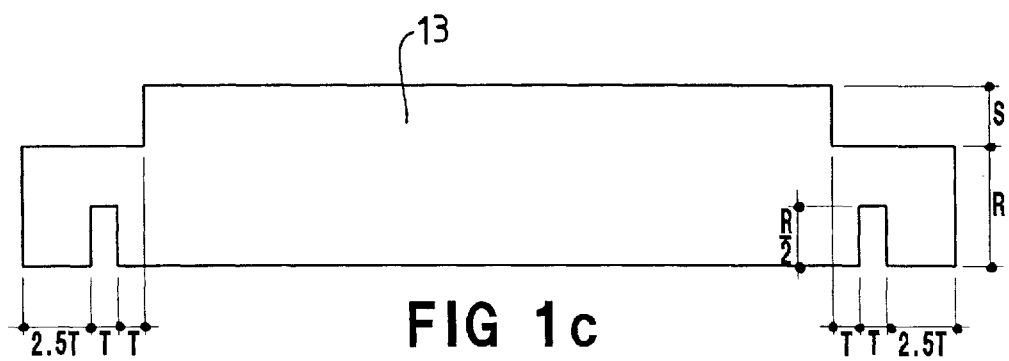
Figure 1D:
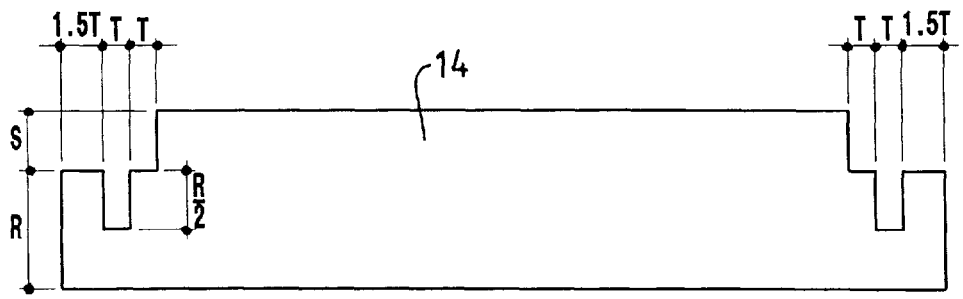

In the arrangement shown, the system includes an upper top rail 11 (FIG. 1b), lower top rail 12 (FIG. 1a), upper bottom rail 13 (FIG. 1c) and lower bottom rail 14 (FIG. 1d).

Each of the rails 11–14 is of elongate rectangular shape and includes an elongate main body portion R and an elongate skirt portion S. The body portion R of upper top rail 11 has two end regions 18 and 19. Each end region 18, 19 includes a connection slot 20, 21 cut into its lower edge. The body portion R of lower top rail 12 also has two end regions 22 and 23 including connection slots 24 and 25 cut into its upper edge.

The width of the slots 20, 21, 24 and 25 is equal to the thickness T of the rail material and their depth is equal to R/2, ie. half the depth of the rail body portions. The position of the slots is determined by the dimensions of the leg member 15. In the embodiment shown the slots are all a distance equal to thickness T horizontally away from the end of the skirt portions S. The body portions of the rails extend beyond the connection slots a distance equal to 1.5T for upper top rail 11 and 2.5T for lower top rail 12. The reason for these dimensions is described further below.

The skirt portion S of upper top rail 11 provides abutment means 26 and 27 in the form of abutment surface S at each end thereof. In use, the skirt portion S extends between two leg members of an erected structure and the end surfaces of the skirt portion S abut the two leg members. Similarly, the skirt portion S of lower top rail 12 includes abutment means 28 and 29 at respective ends thereof.

Top rails 11 and 12 may also be used as intermediate rails within a shelving system. The depth of the main body portions R and skirt portions S may be made the same for the intermediate rails as for the top rails, or alternatively they may be made different, depending on the visual appearance and strength required. Preferably, the intermediate rails have a reduced body portion depth R to provide a more open and aesthetically lighter structure.

The terminology of "upper" and "lower" rails as used herein is determined by the location of the connection slots on the top or bottom edge of the rails. Upper rails have connection slots on their bottom edge and lower rails have connection slots on their upper edge.

Upper and lower bottom rails 13 and 14 respectively (FIGS. 1c & d) are similar in shape to upper and lower top rails 11 and 12, except that the skirt portion S is positioned above the main body portion R. It will be appreciated that the top and bottom rails may be made interchangeable if appropriate dimensions are selected.

The leg members 15 (FIGS. 1e–g) are also made from 18 mm MDF (T=18 mm). FIG. 1e shows a front view of a leg member 15, FIG. 1f shows a side view and FIG. 1g shows a plan view. The legs 15 are formed from four elongate elements 30–33 with elements 30 and 31 being T×T and elements 32 and 33 being 2T×T. Each of the elements 30–33 are spaced a distance T apart by spacer means in the form of cross-shaped blocks 34–36 to provide a snug fit around rail members 11–14. The outer dimensions of legs 15 are accordingly 3T×4T. The spacer blocks 34–36 also serve as support means for rail members 11–14 and have a vertical dimension B equal to that of the rail skirt portion S.

Figure 1H:
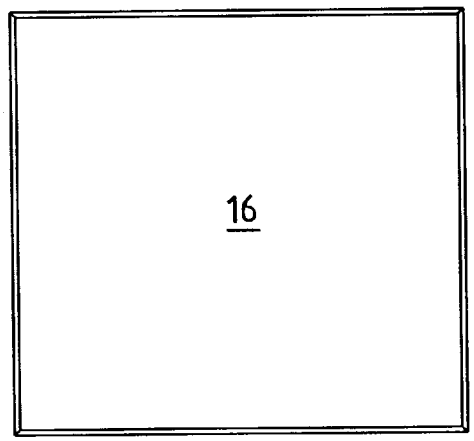
Figure 1I:
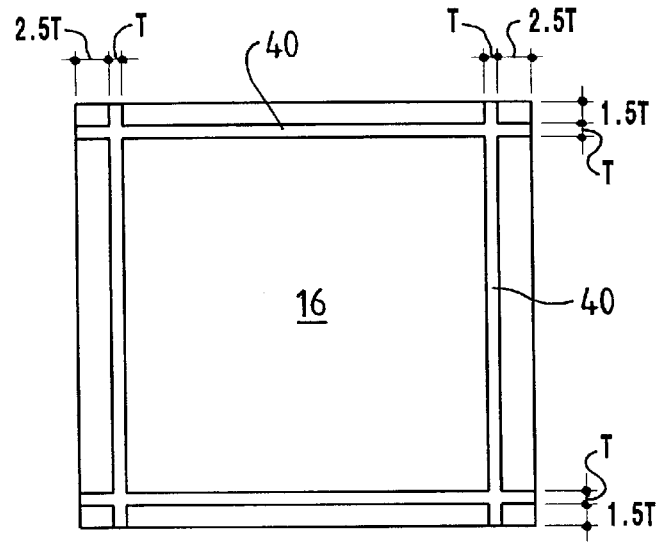

Surface panel 16 (FIGS. 1h and i) is useable as a table top, seat, topmost shelf or the like. FIG. 1h shows a plan view of the panel 16 while FIG. 1i shows a bottom view. The panel 16 is provided with rebates 40 in its bottom face (FIG. 1i) to align with and seat on the top edges of top rails 11 and 12.

Figure 1J:
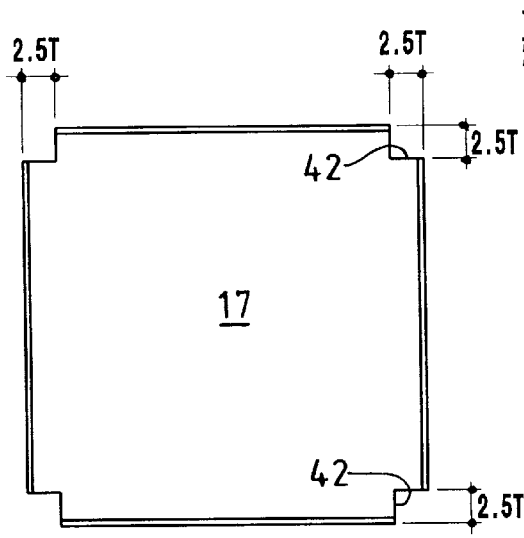
Figure 1K:
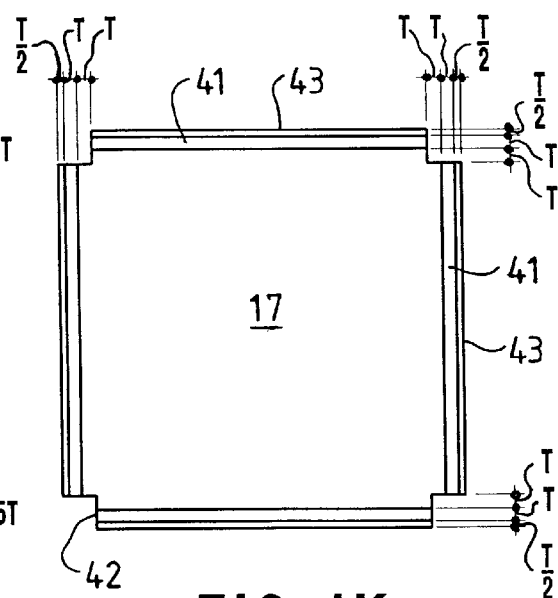

Surface panel 17 (FIGS. 1j and k) is useable as a bottom shelf, intermediate shelf or similar. FIG. 1j shows a plan view of panel 17 while FIG. 1k shows a bottom view. The panel 17 is provided with rebates 41 in its bottom face to align with and seat on the top edges of bottom rails 13 and 14, or on intermediate rails. In the embodiment shown in FIG. 1k the rebates 41 are located a distance T/2 (0.5T) from the edges 43 of panel 17. This distance may be increased to T or 1.5T so as to increase the strength of the overhang between the rebate 41 and edge 43. An overhang equal to T would have the effect of aligning two opposite edges 43 of surface panel 17 with an outer face of legs 15, when panel 17 is placed in position in an assembled structure. Surface panel 17 is also provided with cutouts 42 at its corners corresponding to the location of legs 15.

Figure 2:
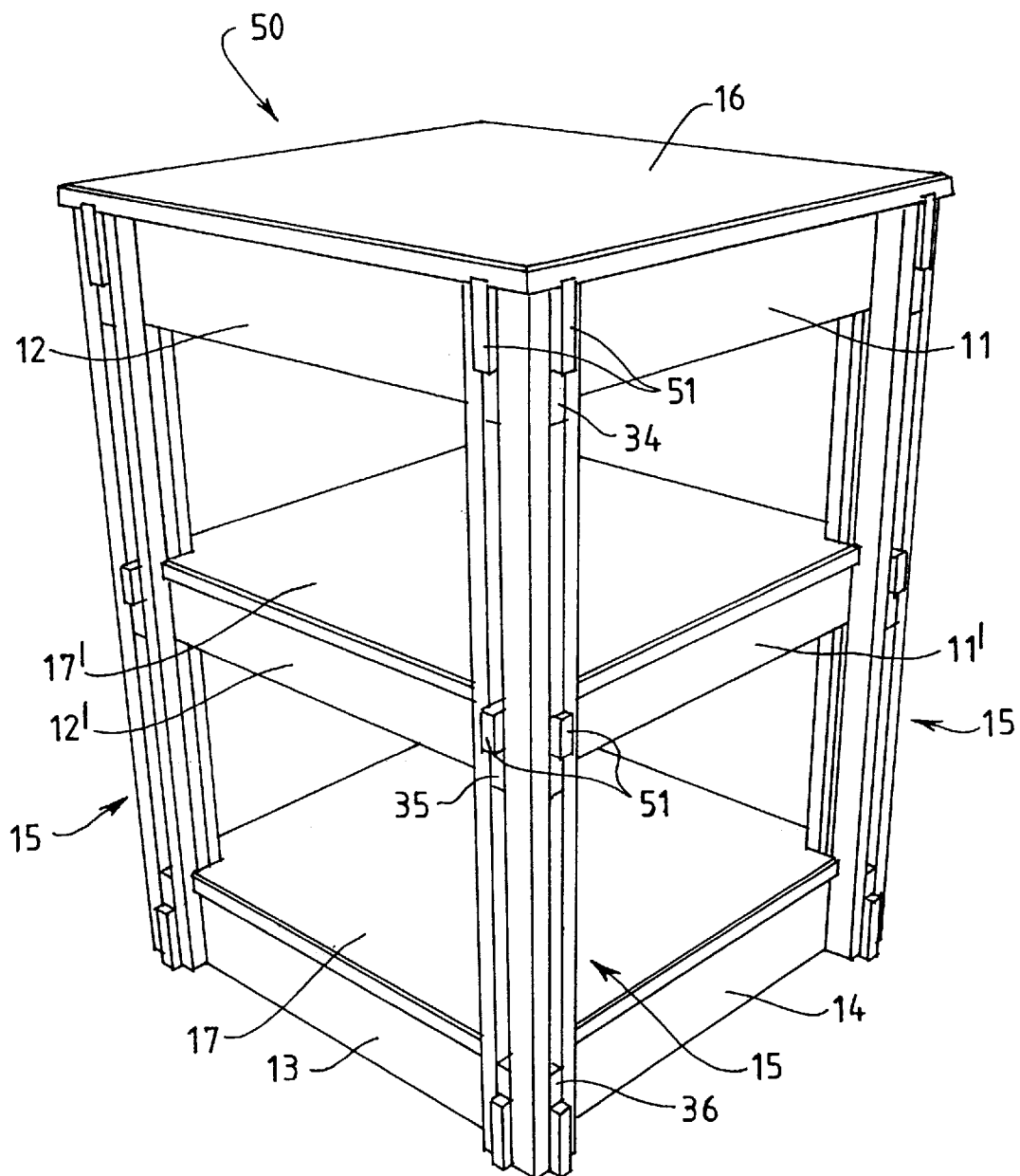
FIG. 2 shows a perspective view of a furniture item erected by means of the construction system FIG. 1.

FIG. 2 shows an upright modular structure 50, useable as a shelving unit, which has been erected by means of the construction system of the invention.

To erect the structure 50, two mating pairs of bottom rails 13, 14 are placed on the floor and interlocked with their skirt portions S facing upward, thereby creating a base or kickboard.

Four leg members 15 are then slid down over the interlocked rails 13, 14 to form a three way joint at each of the four corners of the structure 50. The bottom shelf 17 is then placed over bottom rails 13 and 14.

Intermediate rails 11' and 12' are slid one at a time through legs 15 and interlocked within the cross-shaped cavity defined by elongate elements 30–33 (refer FIGS. 1*e–g*). Intermediate shelf 17' is then placed in position over intermediate rails 11', and 12'.

Top rails 11 and 12 are slid down over legs 15 and interlocked. Top surface panel 16 is then placed in position overtop rails 11 and 12.

In the embodiment shown in FIG. 2 the horizontal rails 11, 11', 12, 12', 13, 14 extend beyond the outer edges of the legs 15 by an amount equal to T/2 to create stubs 51. The additional length of T/2 in the body portion R of the rails provides extra strength to the joints. The distance required from the connection slots to the end of the rails depends on the orientation of the legs through which the rails pass. For example, where lower top rail 12 passes through the wider dimension 4T of leg 15 then the distance from the connection slot to the end of the rail must be 2.5T to create a stub 51 of 0.5T. Where upper top rail 11 passes through the narrower dimension 3T of leg 15 then the distance from the connection slot to the end of the rail must be 1.5T, to create a stub 51 of 0.5T. These dimensions may best be appreciated by reference to FIG. 3.

Figure 3:
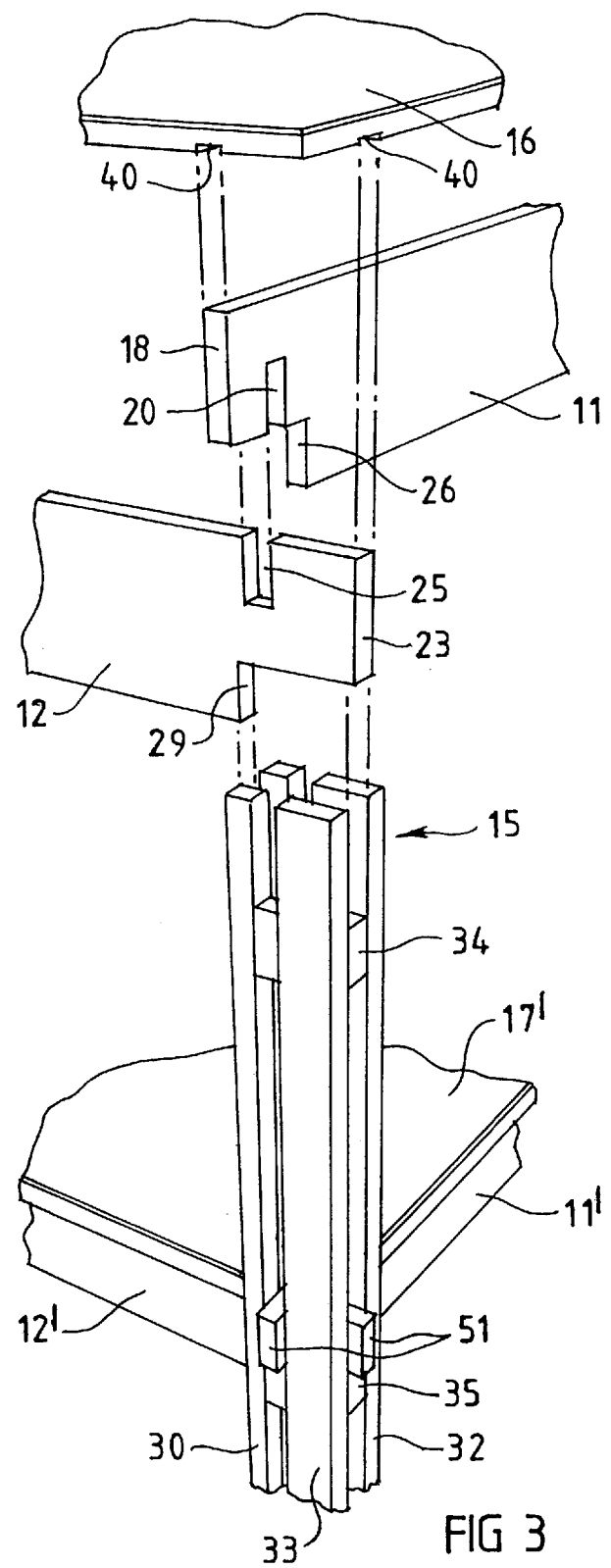
FIG. 3 shows a perspective view of two interlocking joints in the furniture item of FIG. 2 of the joints being shown in an exploded perspective view.
Figure 4A:
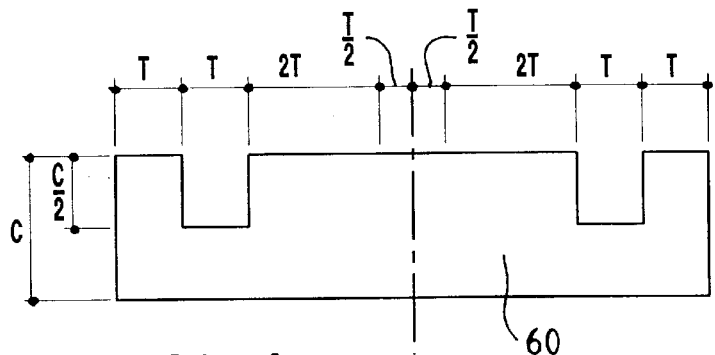
FIGS. 4a–d show a side view of coupling and securing elements for use in the construction system of the invention.
Figure 4B:
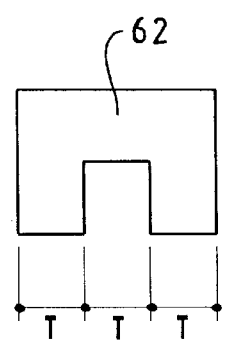
Figure 4C:
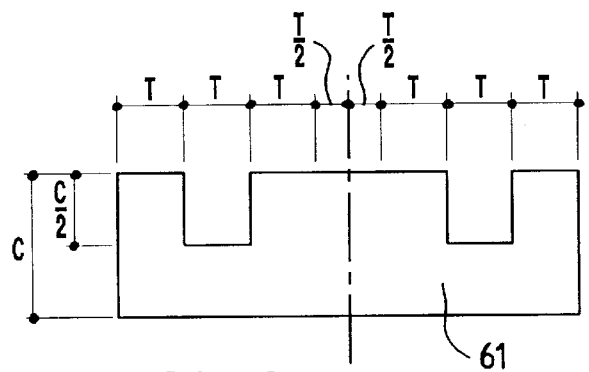
Figure 4D:
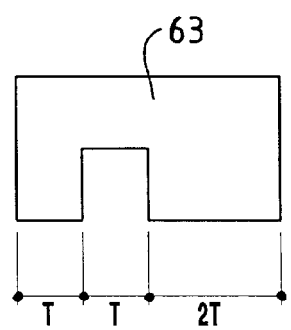

FIG. 3 shows a more detailed view of two three-way joints in the modular structure 50 of FIG. 2. The structure of the two joints shown is the same. Upper intermediate rail 11' is similar to upper top rail 11 and lower intermediate rail 12' is similar to lower top rail 12. The intermediate rails 11' and 12' are merely of reduced depth compared to top rails 11 and 12.

Referring to the top joint shown, the end region 23 of lower top rail 12 is slid into the cross-shaped cavity between elongate elements 30–33 of leg 15 until it rests on cross-shaped block 34. The end region 18 of upper top rail 11 is then slid into the cavity between elements 30–33 of leg 15, perpendicularly to lower rail 12. Connection slot 20 in upper rail 11 thus slides along and interlocks with connection slot 25 in lower rail 12, thereby creating a fully interlocked crossed halved joint between the body portions R of upper and lower rails 11 and 12, and that joint is enveloped within the cavity formed between the four elements 30–33 of leg 15.

The skirt portions S (refer to FIGS. 1*a, b*) of the rails 11 and 12 extend vertically down the length of leg 15 such that abutment surfaces 26 and 29 abut the sides of block 34, thus providing additional rigidity to the three way joint. In the embodiment shown, the blocks 34 have the same vertical size B (refer FIG. 1*f*) as the skirt portions S of rails 11 and 12, thus providing maximum contact between the abutting surfaces. This arrangement also has the advantage of maintaining continuous horizontal lines around the periphery of the structure, thereby giving an aesthetically pleasing form to the assembled module.

Once the top rails 11 and 12 are in position the top surface panel 16 is located such that rebates 40 align with and seat on the top edge of the rails 11 and 12. The body portion R of each top rail 11 and 12 may be sized to project above the top of leg 15 by an amount equal to the depth of rebate 40 in panel 16. Alternatively, the position within the leg 15 of the block 34 may be adjusted.

FIGS. 4*a–d* show coupling elements 60 and 61 and securing elements 62 and 63 for connecting modular structures 50 (FIG. 2) together.

Long coupling element 60 is designed to pass through the wider dimension 4T of the cross-shaped cavities of two adjacent legs 15. The indicated dimensions 2T on coupling element 60 correspond to and sit between longitudinal leg elements 32 and 33 (each being 2T in one dimension—refer FIG. 3) of the two adjacent modules 50. The distances T/2 correspond to abutting stubs 51 on the two modules 50.

Once the long coupling element 60 is slid into position, securing elements 62 are slid through the narrow dimension 3T of the cavity in each leg 15 and then fully interlocked with coupling element 60 using crossed halved joints.

Similarly, short coupling element 61 is designed to pass through the narrow dimension 3T of the cross-shaped cavities of two adjacent legs 15, and to be locked in place using securing elements 63. The dimension 2T on securing element 63 corresponds to and sits between longitudinal leg elements 32 and 33 (refer FIG. 3).

In each case, the depth C of coupling elements 60 and 61 is the same as that of the securing elements 62 and 63. The connection slots are each C/2 so that fully interlocked halved joints bring the coupling element and securing elements into a common plane.

Figure 5:
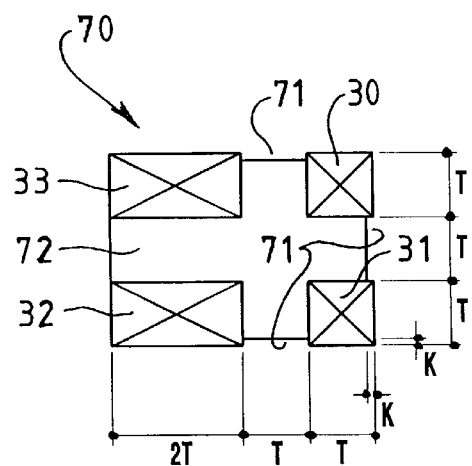
FIG. 5 shows a plan view of an alternative leg member for use in the construction system the invention.

FIG. 5 shows a plan view of an alternative leg 70. Leg 70 includes means for receiving the abutment means 26–29 of the rail members. The receiving means are in the form of keyways 71 provided within portions of the cavity between elongate elements 30–33. The abutment means 26–29 abut the sides of a truncated cross-shaped block 72 mounted within the cavity. The keyways 71 provide additional lateral support to the rails at the joints. Specifically, the sides of the keyways 71 engage the side faces of the skirt portion S of the rails and thereby prevent the bottom edges of the rails from moving sidewards. The additional support of the skirt portion S increases the rigidity of the joints and hence the rigidity of the assembled structure.

The depth K of the keyway 71 does not have to be very great to be effective. Applicant is found that if 18 mm MDF is used as the construction material then the keyway need be no deeper than 2 mm.

It will be appreciated that for the keyways 71 to be effective the skirt portion S of the rails must be made longer in the horizontal direction by an amount equal to the depth K of the keyways 71.

It will similarly be appreciated that if the coupling elements 60 and 61 and securing elements 62 and 63 (FIG. 4) are used in conjunction with the alternative legs 70 having keyways 71, it may be desirable to shorten the end portion of each element by an amount equal to the depth K of the keyway 71. This would have the effect of aligning the end of the coupling elements 60,61 and securing elements 62,63 with the outer faces of the cross-shaped block 72.

Figure 6:
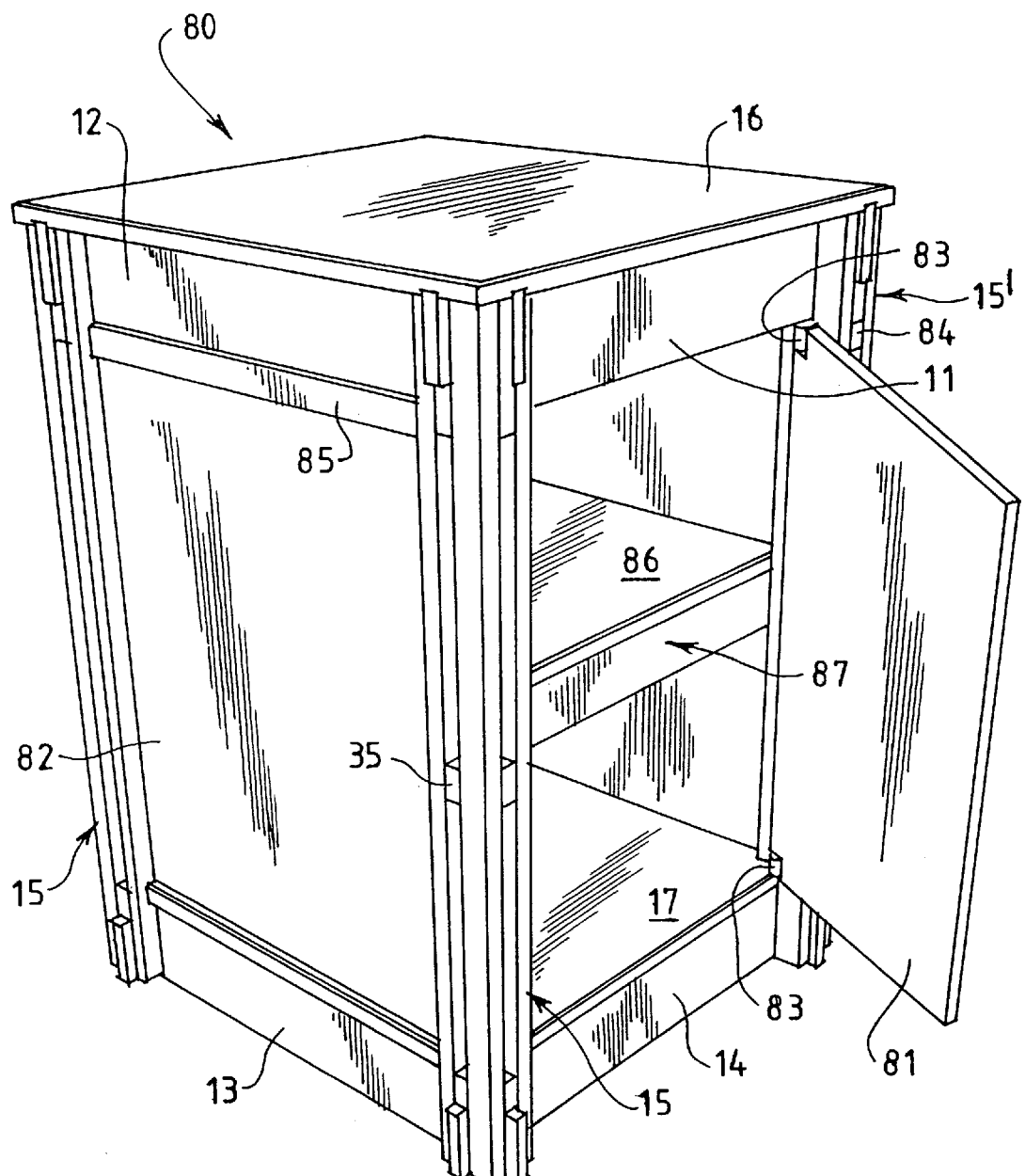
FIG. 6 shows a perspective view of an alternative furniture module erected by means of the construction system of the invention.

FIG. 6 shows an alternative modular structure 80, useable as a cupboard, which has been erected by means of the construction system of the invention. The cupboard 80 is similar to the modular structure 50 of FIG. 2 in that it includes top rails 11 and 12, bottom rails 13 and 14, legs 15, top surface panel 16 and bottom surface panel or shelf 17. However, the cupboard 80 also includes a door panel 81 and wall panels 82.

Door panel 81 is pivotably connected to leg member 15' by hinge elements 83 held within the cross-shaped cavity of leg member 15' by a securing element 84, in a manner similar to the coupling elements 60 and 61 and securing elements 62 and 63. If needed, the bottom shelf 17 may be provided with a door stop in the form of a pin or dowel pushed into a hole drilled at the required position (not shown). Door panel 81 may also be provided with a handle (not shown).

Wall panel 82 is retained in a horizontal direction between leg members 15 and is retained in a vertical direction between a shallow rebate in the upper face of bottom shelf 17 and an H-section retaining member 85 positioned at the bottom edge of top rail 12. In a cupboard module which uses the alternative leg 70 shown in FIG. 5, the wall panels 82 are also supported at their side edges in the keyways 71 located at each cross-shaped block 72 in the leg 70.

The cupboard 80 is also provided with an intermediate shelf panel 86, held on intermediate rails 87, which in turn are supported by the wall panels 82. It will be noted that this shelf arrangement is different to that shown in FIGS. 2 and 3.

FIG. 7a shows a front elevation of a hinge element 83 as used in the cupboard 80 of FIG. 6. FIG. 7b shows a plan view of the same hinge element 83. FIG. 7c shows a side elevation of a securing element 84 for use with the hinge element 83. T is the thickness of the material and H is the height of the hinge and securing elements 83 and 84 respectively. In an embodiment using the alternative leg members 70 (FIG. 5) having keyways 71, K is the depth of the keyway 71. In use, the hinge element 83 and securing element 84 are interlocked by a crossed halved joint located within the cross-shaped cavity of a leg member 15' or 70.

FIGS. 8a, 8b and 8c show front, plan and side views respectively of a door panel 81 as used in the cupboard 80 of FIG. 6. In the embodiment shown, the door panel 81 is provided with projecting pins 88 for cooperation with corresponding cylindrical bores 89 of hinge elements 83 (refer FIG. 7). The pins 88 are rigidly secured to the door panel 81 and are free to rotate within the bores 89. This arrangement may of course be reversed such that the pin is fixed to the hinge 83 and the door panel 81 has a corresponding bore 89.

FIGS. 9a, 9b and 9c show front, plan and side views respectively of a wall panel 82 as used in the cupboard 80 of FIG. 6. The panel 82 is provided with shelf support blocks 90 mounted within rebates 91 cut along each vertical edge of the panel. The blocks 90 are used to support the intermediate rails 87 and in turn the intermediate shelf panel 86 shown in FIG. 6. The width of each block 90 is equal to the thickness T of the intermediate rail 87. The width of the rebates 91 is equal to the width of the block 90 plus the depth K of the keyways 71 of leg members 70, assuming these legs are used.

In the embodiment shown, the shelf support blocks 90 are set within rebates 91 so as to sit flush with the surface of the panel 82. This allows the panels 82 to be flat packed for transport and storage. It will be appreciated however that other shelf support arrangements are also possible.

FIGS. 10a, 10b and 10c show front, plan and side views respectively of an H-section retaining member 85 for securing the top edge of the wall panel 82 to the bottom edge of the top rail 12. During assembly of the furniture module 80, the wall panel 82 is slid downwardly between the legs 15 to rest on bottom shelf panel 17, the H-section retaining member 85 is placed on top of the wall panel 82 and the top rail 12 is then slid downwardly into the cavity within the legs 15 and into the top channel of the retaining member 85.

FIGS. 11a and 11b show front and side views respectively of an optional cover element or strip 95 which may be used to cover the open cavity within each leg 15 of an erected structure or furniture module. The leg 15 shown in FIG. 11 corresponds to the forward most leg of the furniture module 80 shown in FIG. 6. The cover strip 95 may be made of a relatively thin sheet material, such as 3 mm MDF, which can be bent so as to clip into notches 96 provided in the top and bottom rails, 12 and 13' respectively. FIG. 12 shows a modified form of bottom rail 13' which includes a notch 96 in which to clip the cover strip 95. The dimension U corresponds to the thickness of the cover strip 95, the dimension 2T corresponds to the width of the longitudinal leg elements 32 and 33 (refer FIG. 1g) and the dimension T/2 forms stubs 51 (refer FIGS. 2 and 3).

The construction system of the present invention provides a readily erectable and demountable modular structure suitable for use as a furniture item. The structure has an appearance of stability, rigidity and permanence, yet is readily demounted as required for storage or reuse in an alternative location or configuration.

The system has sufficient flexibility to enable the erection of various modular structures for different purposes. However, those modules retain a common structural appearance ensuring harmonious combinations of furniture items within a room or store.

Finally, it should be appreciated that various modifications and/or additions may be made to the construction system without departing from the spirit or ambit of the invention as disclosed herein or the scope of the appended claims.

I claim:

1. A construction system suitable for erecting a modular structure, said system including:
   a first part,
   a second part connectable with the first part by means of a releasable cross connection; and
   an elongate third part having a cavity extending substantially over its full length, said cavity being adapted to receive said cross connection at any one of several positions along the length of said cavity.

2. A construction system according to claim 1 wherein said cavity has in transverse cross-section a profile which Is adapted to envelop said cross connection.

3. A construction system according to claim 1 wherein in use at least one of said first and second parts projects normally from the third part.

4. A construction system according to claim 1 wherein the third part includes support means for supporting the cross connection at a selected position along the elongate third part.

5. A construction system according to claim 4 wherein the support means includes a block element mounted within the cavity.

6. A construction system according to claim 1 wherein the third part includes four elongate elements fixed together by means of a spacer element.

7. A construction system according to claim 6 wherein the spacer element includes support means for supporting the cross-connection.

8. A construction system according to claim 1 wherein the third part is generally rectangular in transverse cross-section and the cavity is generally cross-shaped in transverse cross-section, the cavity being accessible from each major face of the third part.

9. A construction system according to claim 1 wherein the third part comprises a leg member for a furniture item.

10. A construction system according to claim 9 wherein the first and second parts each comprises a rail member disposed transversely to the leg member.

11. A construction system according to claim 10 wherein at least one of said rail members includes abutment means, said abutment means being offset from the cross connection along the length of the leg member, for laterally abutting the leg member.

12. A construction system according to claim 11 wherein the leg member includes means for receiving said abutment means, said receiving means being provided by a portion of the cavity.

13. A construction system according to claim 12 wherein the leg member includes a block element mounted within the cavity for supporting the cross connection at a selected position along the leg member and wherein said portion of the cavity extends between said block element and a major face of the leg member.

14. A construction system according to claim 10 wherein each rail member is generally rectangular and is formed from planar material having a uniform thickness, wherein a slot is provided adjacent an end region of each rail member for interlocking with a corresponding slot provided in another rail member to form said cross connection and wherein said cross connection comprises a fully interlocked crossed halved joint.

15. A construction system according to claim 14 wherein each rail member includes an elongate main body portion and a skirt portion, the main body portion containing the slots for interlocking the rail members and the skirt portion including abutment means, offset from the cross connection along the length of the leg member, for abutting the leg member.

16. A construction system according to claim 15 wherein the skirt portion of each rail member is configured to extend between leg members of an erected modular structure and the abutment means are provided at respective ends of the skirt portion.

17. A construction system according to claim 10 further including a surface panel having rebates in one face thereof, said rebates being arranged to receive the rail members of an erected modular structure.

18. A construction system according to claim 9 wherein the first part comprises a coupling element for coupling the leg member of an erected modular structure to a like leg member of another modular structure and the second part comprises a securing element for securing the coupling element to the first mentioned leg member.

19. A construction system according to claim 9 wherein the first part comprises a hinge element for pivotably attaching a door panel to the leg member and the second part comprises a securing element for securing the hinge element to the leg member.

20. A construction system according to claim 19 further including a door panel.

21. A construction system according to claim 9 further including a wall panel adapted to fit between the leg member and another leg member of an erected modular structure whereby at least one edge of the wall panel is engagable within said cavity.

22. A construction system according to claim 1 further including a cover element for covering from view the cavity within the third part and wherein at least one of the first part and the second part includes means for securing the cover element to the third part.

23. A modular structure erected by means of a construction system as defined in claim 1.

24. An item of furniture including a plurality of leg members and a plurality of rail members, the rail members being connected to each other by means of releasable cross connections therebetween and each leg member having a cavity extending substantially over its full length, said cavity being adapted to receive at least one of said cross connections at any one of several positions along the length of said cavity.

25. A method of erecting a modular structure including the steps of:

providing a first part and a second part, said first and second parts being connectable by a releasable cross connection;

providing an elongate third part having a cavity extending substantially over its full length, said cavity being adapted to receive said cross connection at any of several positions along its length;

locating the first part at a selected one of said positions along said cavity such that it intercepts the cavity in a first direction;

locating the second part such that it intercepts the cavity in a second direction; and connecting the first and second parts within the cavity.

* * * * *